(12) United States Patent
Briese

(10) Patent No.: US 7,949,246 B2
(45) Date of Patent: May 24, 2011

(54) CONTROL CIRCUIT FOR THE SYNCHRONIZED OR ALTERNATE TRIGGERING OF AT LEAST TWO FLASH DEVICES

(76) Inventor: Hans-Werner Friedrich Briese, Hamburg (DE)

( * ) Notice: Subject to any disclaimer, the term of this patent is extended or adjusted under 35 U.S.C. 154(b) by 0 days.

(21) Appl. No.: 12/675,950

(22) PCT Filed: Jul. 30, 2008

(86) PCT No.: PCT/EP2008/006503
§ 371 (c)(1),
(2), (4) Date: Mar. 1, 2010

(87) PCT Pub. No.: WO2009/030335
PCT Pub. Date: Mar. 12, 2009

(65) Prior Publication Data
US 2010/0226638 A1    Sep. 9, 2010

(30) Foreign Application Priority Data

Aug. 29, 2007  (DE) ............... 20 2007 012 203 U

(51) Int. Cl.
*G03B 15/03* (2006.01)
(52) U.S. Cl. ....................... 396/155; 396/205
(58) Field of Classification Search ........... 396/155, 396/180, 198
See application file for complete search history.

(56) References Cited

U.S. PATENT DOCUMENTS

| 4,500,190 | A | | 2/1985 | Kuroki | |
| 5,272,500 | A | * | 12/1993 | Taniguchi et al. | 396/155 |
| 5,570,148 | A | * | 10/1996 | Hibino et al. | 396/182 |
| 6,029,013 | A | | 2/2000 | Larkin et al. | |
| 7,633,547 | B2 | * | 12/2009 | Watanabe et al. | 348/371 |
| 2002/0064383 | A1 | | 5/2002 | Kawasaki et al. | |
| 2004/0151487 | A1 | | 8/2004 | Iwasaki et al. | |

FOREIGN PATENT DOCUMENTS

| CA | 1 195 723 | 10/1985 |
| DE | 44 33 686 | 1/1996 |
| JP | 59-064821 A | 4/1984 |
| JP | 03-021939 A | 1/1991 |

OTHER PUBLICATIONS

International Search Report and Written Action, PCT/EP2008/006503, dated Jan. 27, 2009.

* cited by examiner

*Primary Examiner* — W. B. Perkey
*Assistant Examiner* — Dennis Hancock
(74) *Attorney, Agent, or Firm* — Venable LLP; Robert Kinberg

(57) ABSTRACT

A control circuit responsive to a flash activating signal of a camera for the synchronous or alternate activation of at least two flash devices is disclosed. Each flash device includes a flash generator including a voltage source and at least one flash unit. An input of the control circuit is adapted to couple with the camera and receive the flash activating signal. Outputs of the control circuit are adapted to electrically couple to control inputs of the flash generators. The control circuit includes a switching device adapted to drawn a supply voltage for the control circuit from the respective voltage sources in the flash generators.

16 Claims, 2 Drawing Sheets

CONTROL CIRCUIT FOR THE SYNCHRONIZED OR ALTERNATE TRIGGERING OF AT LEAST TWO FLASH DEVICES

CROSS-REFERENCE TO RELATED APPLICATIONS

This application is a National Stage Application of PCT/EP2008/006503, filed Jul. 30, 2008, which designates the United States and claims the priority of German Patent Application No. 20 2007 012 203.9, filed on Aug. 29, 2007.

BACKGROUND OF THE INVENTION

The present invention concerns a control circuit for the synchronous or alternate activation of at least two flash devices each consisting of a flash generator and at least one flash means, by flash activating signals of a camera at the input of the control circuit via outputs of the control circuit electrically connected to the control inputs of the flash generators.

Control circuits of this kind are used in particular in fields of professional photography in connection with studio flash systems, the use of such control circuits not being confined to the fields mentioned. Usually the flash systems comprise several flash means which are supplied via corresponding flash generators to activate flashes. The control inputs of the flash generators are in turn connected to the outputs of the control circuit, so that for activating flashes, for example by a camera, by corresponding flash request signals at the input of the control circuit flash activating signals are generated at the control circuit outputs.

The maximum number of flashes that can be activated per unit of time is limited by the recharging time of the individual flash generators. After activation of a flash and the associated discharge of the storage elements of the respective flash generator, a length of time passes for recharging the storage elements until the flash generator is ready for activating a flash again.

From German patent document DE 4433686C1 is known a studio flash system having a plurality of function elements which comprise one or more electronic control means for the control of several flash devices. It is known that different configurations of a flash system consisting of power supply units, storage elements, flash heads and electronic control means can be controlled electronically. In this case, for example an electronic control means is supplied by a power supply unit which controls several flash devices composed of storage elements and flash heads.

The voltage supply of the known electronic control means is via external or internal power supply units or other voltage sources, for example batteries or accumulators. A drawback is that the electronic control means have to be supplied with electricity via an additional power supply unit or, in the case of an integrated power supply unit, via additional lines. If batteries or accumulators are used, the control means must first be equipped with full batteries or charged up before use. If they are not used for a long time, it must be assumed because of automatic discharge that the electronic control means is not ready for use after some time of not being used because of discharged batteries or accumulators. A further drawback arises from the fact that the electronic control means must have an interface configured and adapted to the respective configuration of power supply units, storage elements and flash heads.

SUMMARY OF THE INVENTION

It is therefore the object of the present invention to provide an easy-to-handle, reliable, universal control circuit for the synchronous or alternate activation of at least two flash devices.

The object is achieved according to the invention by the control circuit described hereinbefore by the fact that the control circuit is assigned switching means which are constructed and designed in such a way that the supply voltage of the control circuit is drawn from the respective flash generators. Via the outputs of the control circuit connected to the control inputs of the flash generators, both activation of the flash devices and supply of the control circuit itself with voltage take place. Thus in a surprisingly simple manner supply of the control circuit is guaranteed without using further power supply units or voltage sources. Further, the control circuit is universally usable, as the control means can be connected to various flash generators of which the control inputs can vary within a wide range with respect to both the amounts of signal levels and the amounts of input impedances.

An appropriate development of the invention is characterised in that the switching means are connected to at least two outputs of the control circuit for obtaining a supply voltage. This ensures that the supply voltage is provided for the control circuit even in the event that sufficient voltage for operating the control circuit cannot be obtained for a certain length of time at one of the outputs during activation of a flash device. In this case the supply voltage of the control circuit is obtained via a non-activating flash device.

A preferred embodiment is distinguished in that the switching means connected to the outputs of the control circuit for obtaining the supply voltage in each case have at least one current-limiting resistor connected in series with a diode. The current-limiting resistor ensures that the current consumed by the control circuit does not exceed an upper limit value, so that possible erroneous activations of the flash generators are reliably prevented.

In a further advantageous embodiment of the invention, in particular the current-limiting resistors have larger dimensions than the quantity of the input impedance of the respective flash generator control inputs, so that the direct current (DC) voltage provided at the control input by the flash generator via an internal resistor falls insignificantly due to extraction of a current for the operating voltage supply of the control circuit. Accidental activation due to a fall in DC voltage at the control inputs of the flash generators is therefore reliably avoided.

Advantageously, the control circuit is arranged in a protected manner in a watertight housing, so that the circuit is protected in particular from moisture-related leakage currents, and therefore error-free operation of the control circuit is ensured.

BRIEF DESCRIPTION OF THE DRAWINGS

Further preferred or appropriate features and arrangements of the invention are apparent from the subsidiary claims and the description. Particularly preferred embodiments are described in more detail with the aid of the attached drawings. The drawings show:

DETAILED DESCRIPTION

Figure 1:
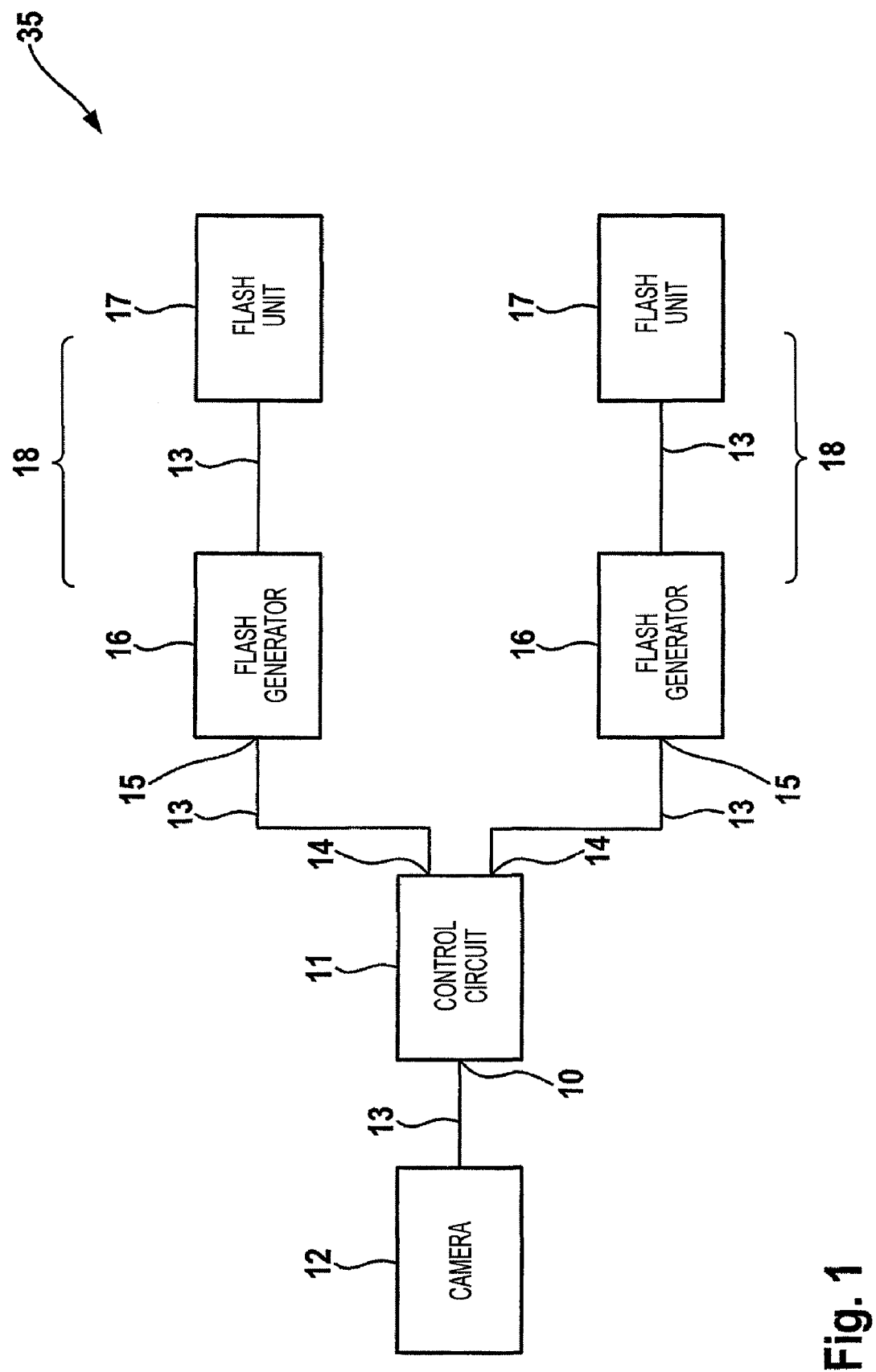
FIG. 1 a schematic view of the basic construction of a flash system by way of example, and FIG. 2 a schematic view of an embodiment of the control circuit.

FIG. 1 shows a schematic view of the basic construction of a flash system 35 by way of example. The flash system 35 comprises a camera 12, a control circuit 11 and flash devices 18 which each consist of a flash generator 16 and a flash means 17. The camera 12 is connected to the input 10 of the control circuit 11 by lines 13 for the provision of flash activating signals. The outputs 14 of the control circuit 11 are each connected by further lines 13 to control inputs 15 of the flash generators 16 which, in conjunction with a flash means 17 connected to the output of the respective flash generator 16, form the flash devices 18. To activate the flash devices 18, starting from the camera 12 via the lines 13 the input 10 of the circuit 11 has applied to it a flash activating signal which causes the control circuit 11 to generate flash activating signals for activating at least one flash device 18 at at least one of the outputs 14 of the control circuit 11.

The control inputs 15 of the flash generators 16 provide a DC voltage of between 5 and 15 V with respect to their earth potential via a high-resistance internal resistor which is usually greater than or equal to one megaohm. Activation of the respective flash generator 16 therefore takes place by means of a flash activating signal by the fact that the control input 15 of the respective flash generator 16 is set to earth potential via the output 14 of the control circuit 11 which is connected to the control input 15 by lines 13.

The manner of activating the flash devices 18 in time can in this case be selected: for synchronous activation, with each flash activating signal at the input 10 of the circuit 11 all flash devices 18 are activated via simultaneously generated flash activating signals at all outputs 14 of the control circuit 11, whereas for alternate activation, flash activating signals succeeding each other in time at the input 10 of the circuit 11 lead to the sequential generation of flash activating signals at one output 14, each, of the control circuit 11 each, so that the flash devices 18 are alternately activated one after the other.

In a further preferred embodiment, the number of outputs 14 of the control circuit 11 and flash devices 18 is not, as shown by way of example in FIG. 1, limited to two each time, but rather can be extended to any number N of outputs 14 for controlling a number N of flash devices 18. According to the preferred embodiment of the control circuit 11 with N outputs 14 of the control circuit 11 and N flash devices 18, in the case of synchronous activation of flash devices 18 any number N-x of flash devices 18 are activated by simultaneous generation of flash activating signals at n outputs 14 of the control circuit 11. In the case of alternate activation of flash devices 18, the N flash devices 18 are alternately activated one after the other, with a free choice of the sequence of activations. Also several groups of flash devices 18 can be activated one after the other, in which case the flash devices 18 belonging to a respective group are each activated simultaneously.

A supply voltage 19 for the control circuit 11 is obtained via the outputs 14 of the control circuit 11 which are connected to the control inputs 15 of the flash generators 16. The outputs 14 of the control circuit 11 therefore fulfill two functions. Firstly, via the outputs 14 of the control circuit 11 the corresponding flash devices 18 are activated via the control inputs 15 of the flash generators 16, and secondly the control circuit 11 obtains the required supply voltage 19 for operating the control circuit 11 from the flash generators 16. The control circuit 11 is for this purpose assigned correspondingly constructed and designed switching means 20 which are in each case connected to at least two outputs 14 of the control circuit 11. Thus, apart from the synchronous activation of all flash devices 18, it is ensured that the supply voltage 19 is obtained via the output 14 of the control circuit 11 to which a flash activating signal is not applied.

Figure 2:
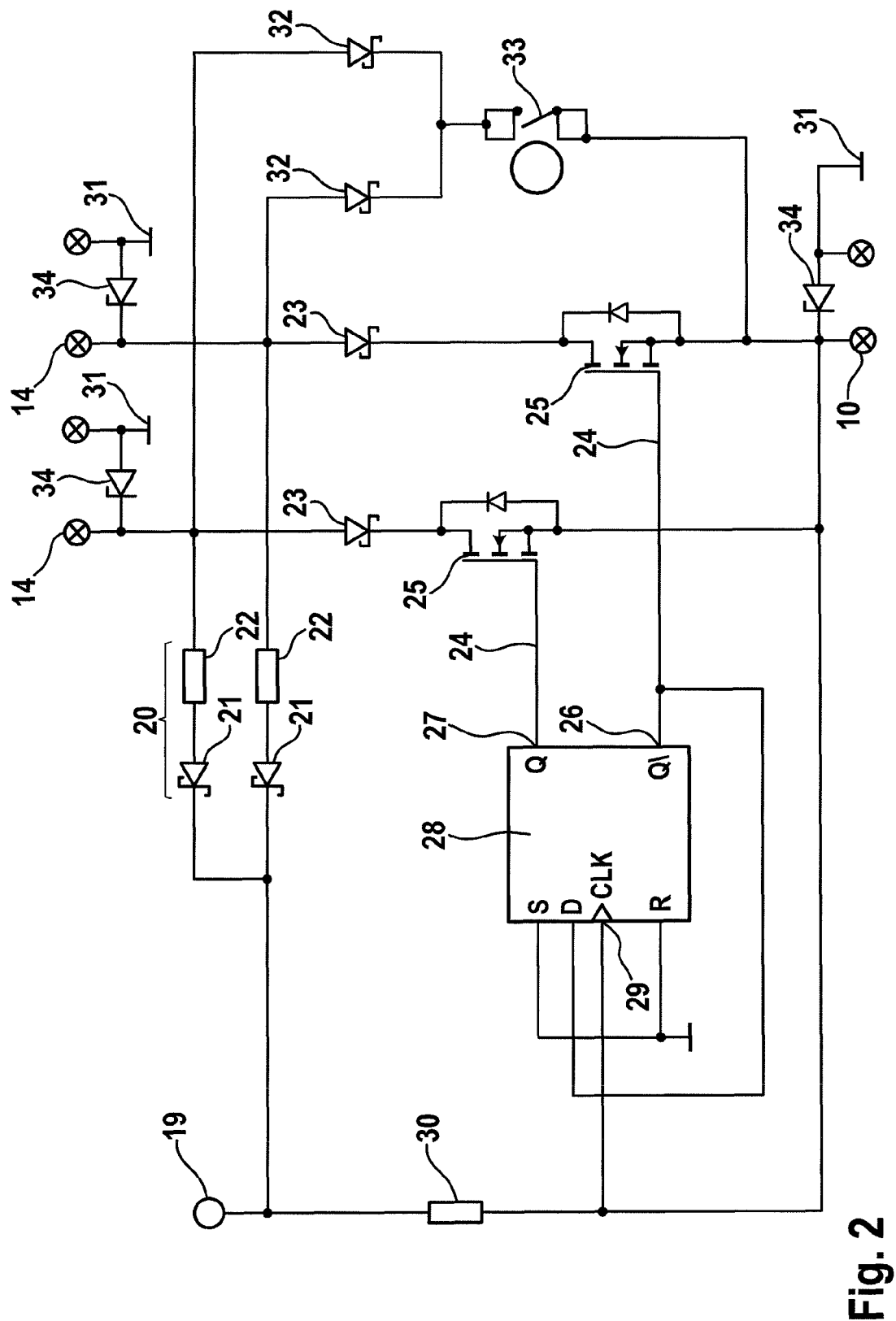

In FIG. 2 the construction of the control circuit 11 is shown schematically with the aid of a construction by way of example for controlling two flash devices 18. The outputs 14 of the control circuit 11 are each connected to switching means 20 for obtaining the supply voltage 19 of the control circuit 11. Each of the switching means 20 comprises a circuit consisting of a diode 21 and at least one current-limiting resistor 22 connected in series. The diodes 21 prevent feedback of the supply voltage 19 to the outputs 14 of the control circuit 11, while the current-limiting resistors 22 prevent an unwanted voltage drop at the internal resistor in the control input 15, so that it is ensured that the current consumption of the control circuit 11 via the outputs 14 of the control circuit 11 from the control inputs 15 of the flash generators 16 does not lead to erroneous activation of one of the flash devices 18 as a result of an unwanted drop in voltage at one of the outputs 14 of the control circuit or at one of the control inputs 15 of the flash generators 16. To ensure this, the quantity of the current-limiting resistors 22 is at least as great as the quantity of the input impedance of the respective control input 15 of the flash generators 16.

Each of the outputs is connected via a circuit consisting of a diode 23 and a switching means 25 connected in series, to the input 10 of the control circuit 11, so that when the switching means 25 becomes conductive, flash activating signals of a camera 12 are conducted via the input 10 of the control circuit 11 to the respective outputs 14. In the embodiment given by way of example in FIG. 2, the switching means 25 are designed as n-conducting field-effect transistors, as they can be controlled without power, so to speak, and therefore the current consumption of the control circuit 11 is reduced to a very great extent. However, the design of the switching means 25 is not limited to field-effect transistors, but instead a large number of components can be used as switching means 25, for example IGBTs, MOSFETs, bipolar transistors or other non-semiconductor-based switching means 25. In particular the use of transistors is not limited to n-conducting types.

The control inputs 24 of the switching means 25 are connected to the inverting output 26 and the non-inverting output 27 of a flip-flop 28, so that for alternate activation of the flash devices 18 one of the switching means 25 is in the conducting state, and the other switching means 25 is in the non-conducting state, and vice versa. As a result, one of the outputs 14 of the control circuit 11 is connected in conductive relationship to the input 10 of the control circuit via the respective switching means 25. A flash activating signal at the input 10 of the control circuit 11 is therefore conducted via the corresponding output 14 of the control circuit 11 to the corresponding control input 15 of one of the flash generators 16 depending on the switching state of the switching means 25, for activating one of the flash devices 18.

The construction of the flip-flop 28 by means of a connection of the clock input 29 of the flip-flop 28 to the inverting output 26 of the flip-flop 28 causes a change of logic level of the flip-flop outputs 26, 27 with each falling edge at the clock input 29 of the flip-flop 28. The input 10 of the control circuit 11 is connected to the clock input 29 of the flip-flop 28, so that flash activating signals starting from a camera 12 via the input 10 of the control circuit 11 cause the flip-flop 28 to be triggered. In other words, the logic level of the flip-flop outputs 26, 27 changes alternately with each flash activating signal at the input 10 of the control circuit 11. Via a pull-up resistor 30, the clock input 29 of the flip-flop 28 and hence also the input 10 of the control circuit 11 is connected to the potential of the supply voltage 19 for flash activating signals with respect to the earth potential terminal 31 of the control circuit. Therefore the input 10 of the control circuit 11 is firstly terminated in the event that no camera 12 is connected to the input 10 of the control circuit 11, and secondly a corresponding voltage is made available in open collector technique to the output circuits which are usually used for flash activation in cameras 12. In a further preferred embodiment of the invention, the pull-up resistor 30 is dimensioned higher in resistance than the smallest current-limiting resistor 22 to avoid collapse of the supply voltage 19 during application of a flash activating signal to the input 10 of the control circuit 11.

The input 10 and/or the outputs 14 of the control circuit 11 have parallel-connected voltage-limiting means 34 for protection against overvoltages. Zener diodes are in particular used here, but of course other means for limiting overvoltages can also be used such as for example varistors, suppressor diodes or the like.

For the synchronous activation of at least two flash devices 18, the outputs 14 of the control circuit 11 are each connected conductively to the input 10 of the control circuit 11 via a diode 32 connected for positive potential differences between corresponding output 14 and input 10 of the control circuit 11, by a switch 33 arranged in series therewith. If the switch 33 is in the closed state, both outputs 14 of the control circuit 11 are connected via the diodes 32 to the input 10 of the control circuit 11. A flash activating signal of a camera 12 at the input 10 of the control circuit 11 thus passes via both outputs 14 of the control circuit 11 to the control inputs 15 of the flash generators 16 for synchronous activation of the flash devices 18.

The invention claimed is:

1. A control circuit responsive to a flash activating signal of a camera for the synchronous or alternate activation of at least two flash devices, each of the at least two flash devices comprising a flash generator and at least one flash unit, each flash generator including a voltage source and a control input, the control circuit comprising:
   an input adapted to couple with the camera and receive the flash activating signal;
   outputs adapted to electrically couple to the control inputs of the flash generators; and
   a first switching device adapted to draw the supply voltage for the control circuit from the voltage sources in the respective flash generators.

2. The control circuit according to claim 1, wherein at least two outputs of the control circuit connect to the first switching device for obtaining the supply voltage.

3. The control circuit according to claim 2, wherein the first switching device comprises two or more switches, each of the switches comprising a diode and at least one current-limiting resistor connected in series with the diode.

4. The control circuit according to claim 3, wherein the diodes of the first switching device are switched in a forward direction with respect to positive voltages between the respective output and the input of the control circuit.

5. The control circuit according to claim 3, wherein the at least one of the current-limiting resistors has a resistance value greater than a quantity of an input impedance of the respective flash generator control input.

6. The control circuit according to claim 5, further comprising a switchable connection between each output and the input of the control circuit, each switchable connection comprising a diode and a second switching device connected in series, the diode operable to switch in a forward direction for positive potential differences between the respective output and the input of the control circuit.

7. The control circuit according to claim 6, further including at least one flip-flop having inverting and non-inverting outputs, wherein the second switching devices have control inputs connected to the inverting and non-inverting outputs of the at least one flip-flop.

8. The control circuit according to claim 7, wherein the at least one flip-flop comprises at least one toggle flip-flop due to a conductive connection of the non-inverting output of the at least one flip-flop to a D input of the at least one flip-flop.

9. The control circuit according to claim 7, wherein a clock input of the at least one flip-flop is connected to the input of the control circuit so the at least one flip-flop is triggered by the flash activating signal at the input of the control circuit.

10. The control circuit according to claim 9, wherein the clock input of the flip-flop is connected via a pull-up resistor to the supply voltage of the control circuit.

11. The control circuit according to claim 10, wherein the pull-up resistor has a higher resistance than the smallest current-limiting resistor.

12. The control circuit according to claim 1, wherein at least one of the input or the outputs of the control circuit comprise parallel-connected voltage limiters for protection against overvoltages.

13. The control circuit according to claim 12, wherein the voltage limiters comprise Zener diodes.

14. The control circuit according to claim 1, wherein for the synchronous activation of at least two flash devices, the control circuit further includes diodes respectively conductively connecting each of the outputs to the input of the control circuit and a switch connected in series with the diodes.

15. The control circuit according to claim 1 forming a combination with a watertight housing, wherein the control circuit is arranged in a protected manner in the watertight housing.

16. A circuit assembly forming a combination with a camera, and flash devices each comprising a flash generator and a flash unit, wherein the control circuit of claim 1 couples the camera to the flash devices.

* * * * *